United States Patent [19]

Mizuno et al.

[11] Patent Number: 5,245,492
[45] Date of Patent: Sep. 14, 1993

[54] MAGNETIC HEAD

[75] Inventors: Yasuo Mizuno; Masaki Ikeda; Akihiko Yoshida, all of Hirakata, Japan

[73] Assignee: Matsushita Electric Industrial Co., Ltd., Osaka, Japan

[21] Appl. No.: 863,610

[22] Filed: Apr. 6, 1992

Related U.S. Application Data

[63] Continuation-in-part of Ser. No. 618,371, Nov. 28, 1990, abandoned.

[30] Foreign Application Priority Data

Nov. 28, 1989 [JP] Japan .................. 1-308671
Jun. 15, 1990 [JP] Japan .................. 2-157966

[51] Int. Cl.⁵ ........................... G11B 5/127
[52] U.S. Cl. ........................ 360/125; 360/120;
501/43; 501/49; 501/50; 501/51; 501/52;
501/77; 501/78; 501/79
[58] Field of Search ............ 501/43, 49, 50, 51,
501/52, 77, 78, 79; 360/119, 120, 125, 126, 127;
29/603; 428/692

[56] References Cited

U.S. PATENT DOCUMENTS

| | | | |
|---|---|---|---|
| 3,420,683 | 1/1969 | Ikeda | 501/49 |
| 4,711,018 | 12/1987 | Matsuzawa | 360/127 |
| 4,811,147 | 3/1989 | Kawai et al. | 360/127 |
| 5,013,360 | 5/1991 | Finkelstein et al. | 501/22 |
| 5,031,063 | 7/1991 | Hasegawa | 360/120 |
| 5,055,957 | 10/1991 | Daughenbaugh et al. | 360/120 |

FOREIGN PATENT DOCUMENTS

| | | | |
|---|---|---|---|
| 1412051 | 8/1965 | France | 501/49 |
| 44-24420 | 10/1969 | Japan | 501/49 |
| 60-255643 | 12/1985 | Japan . | |
| 61-36135 | 2/1986 | Japan . | |
| 61-111935 | 5/1986 | Japan . | |
| 62-36040 | 2/1987 | Japan . | |
| 63-170240 | 7/1988 | Japan . | |
| 63-206330 | 8/1988 | Japan . | |
| 776784 | 6/1957 | United Kingdom . | |
| 1041945 | 9/1966 | United Kingdom | 501/49 |

OTHER PUBLICATIONS

World Patents Index Accession No. 70-33909R (1970).
Chem. Abst. 102 column 171513y (1985).
Chem. Abst. 97 column 27612r (1982).
Chem. Abst. 109 column 195921a (1988).
Chem. Abst. 110 column 178286a (1989).
"Technical Study Reports of the Electronics, Information and Communication Society", MR-86-4.
"Technical Study Reports of the Electronics, Information and Communication Society", MR-87-14.
"National Technical Report", vol. 37, No. 4, 498–505 (1991).

*Primary Examiner*—Mark L. Bell
*Assistant Examiner*—Deborah Jones
*Attorney, Agent, or Firm*—Wenderoth, Lind & Ponack

[57] ABSTRACT

A magnetic head comprising magnetic core halves which are sealed with a sealing glass which consists essentially of 1 to 75 wt. % of $TeO_2$, 1 to 30 wt. % of $B_2O_3$, 1 to 75 wt. % of PbO, 1 to 25 wt. % of CdO, 0 to 15 wt. % of ZnO, 0 to 25 wt. % of $Bi_2O_3$, 0 to 5 wt. % of $A_2O$ wherein A is an alkali metal, 0 to 35 wt. % of ARO wherein AR is an alkaline earth metal, 0 to 35 wt. % of $La_2O_3$, 0 to 5 wt. % of at least one oxide selected from the group consisting of $Al_2O_3$, $SiO_2$, $TiO_2$ and $ZrO_2$, 0 to 10 wt. % of at least one oxide selected from the group consisting of $Ta_2O_5$, $Nb_2O_5$, $WO_3$ and $MoO_3$, 0 to 30 wt. % of $PbF_2$, and 0 to 2 wt. % of CoO, has a coefficient of thermal expansion of from $82 \times 10^{-7}/°C$. to $137 \times 10^{-7}/°C$. in a temperature range between 30° C. and 300° C., a working temperature of from 430° to 620° C. and water resistance of the first class, which glass is not deeply colored and is not devitrified during the assembly of the magnetic head.

1 Claim, 5 Drawing Sheets

FIG.4D
FIG.4C
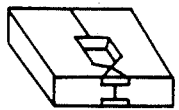
FIG.4H
FIG.4B
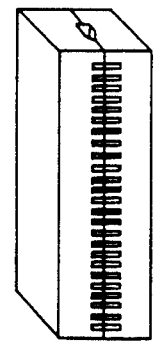
FIG.4F
FIG.4G
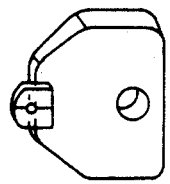
FIG.4K
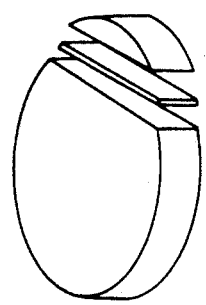
FIG.4A
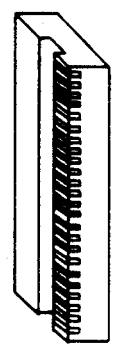
FIG.4E
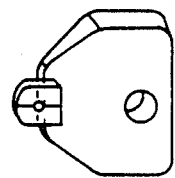
FIG.4J
FIG.4I FIG.5A — GLASS / ALLOY / SUBSTRATE
FIG.5B
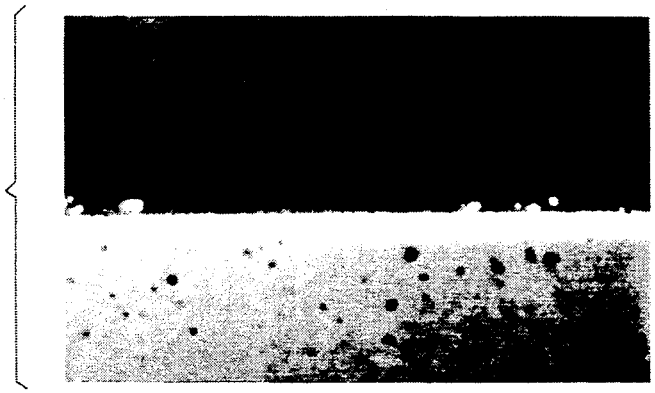
FIG.5C

MAGNETIC HEAD

This application is a continuation-in-part application of Ser. No. 07/618,371 filed on Nov. 28, 1990 now abandoned.

BACKGROUND OF THE INVENTION

1. Field of the Invention

The present invention relates to a magnetic head using a specific sealing glass for assembling.

2. Description of the Related Art

With the progress of electronics, need for various kinds of glass has been increased.

Conventional sealing glasses will be described by making reference to a sealing glass for magnetic heads. FIG. 1 shows a perspective view of a typical magnetic head for a VTR which comprises a core made of ferrite. Ferrite core parts 1 are facing to each other with a constant gap distance therebetween, and a formed gap is filled with a gap glass 2 and bonded with a sealing glass 3. Around the ferrite core parts, a coil 4 is wound.

Although, the sealing glass should be sufficiently softened and flowed to bond the cores when heated, a softening or working point is preferably as low as possible to prevent interaction between the core material and the glass.

Further, the sealing glass has a coefficient of thermal expansion close to that of the ferrite. In general, the ferrite has a coefficient of thermal expansion of $80 \times 10^{-7}$ to $115 \times 10^{-7}/°C$. Recently, a ferrite having high saturation magnetic flux density has been developed to be used with a high resolution tape. Such new ferrite has a coefficient of thermal expansion of about $130 \times 10^{-7}/°C$. (see, for example, Horikawa et al, the Preprint for the Society of Applied Physics, 4a-ZE-8, October, 1985). As magnetic materials as substitutes for the ferrite in the same fields, amorphous alloys, superstructured nitride alloys (see, for example, the Technical Study Reports of the Electronics, Information and Communication Society, MR-86-4, 87-14) and Sendust have been used. Among them, Sendust has a coefficient of thermal expansion of about $140 \times 10^{-7}/°C$. Such new magnetic materials 5 are formed near the gap of the magnetic head by sputtering as shown in FIG. 2, in which "6" represents a gap depth, and "16" represents an opening for winding. The sealing glass should have a coefficient of thermal expansion suitable for such structure of the magnetic head of FIG. 2.

The magnetic head is polished during processing. Since water is used in the polishing step, the sealing glass is required to have good water resistance. In addition, if the glass is darkly colored or devitrified (or crystallized) during processing, an apex 7 is not seen when the gap depth 6 is adjusted at a predetermined depth.

In view of the above facts, the sealing glass for the magnetic head should meet at least following requirements:

(a) Its working temperature is low.
(b) Its coefficient of thermal expansion is close to that of the magnetic material, for example, from $80 \times 10^{-7}$ to $140 \times 10^{-7}/°C$.
(c) It has good water resistance.
(d) It is not darkly colored and not devitrified (crystallized) during processing.

As a result of preliminary experiments on the water resistance of the glass, it was found that the glass preferably has water resistance of "First Class" when graded according to the classes determined by the Japan Optical Glass Industries Association (Nippon Kogaku Garasu Kogyokai), which is explained below.

From the above view points, various sealing glasses have been proposed.

(1) Japanese Patent Kokai Publication Nos. 255643/1985, 36135/1986 and 111935/1986 disclose a glass having a coefficient of thermal expansion of $70 \times 10^{-7}$ to $130 \times 10^{-7}/°C$. and a working temperature of from 400° to 600° C.

(2) Japanese Patent Kokai Publication No. 36040/1987 discloses a glass having a coefficient of thermal expansion of $112 \times 10^{-7}$ to $155 \times 10^{-7}/°C$. and a working temperature of from 400° to 560° C.

(3) Japanese Patent Kokai Publication No. 170240/1988 discloses a glass having a coefficient of thermal expansion of $119 \times 10^{-7}$ to $126 \times 10^{-7}/°C$. and a working temperature of 550° C.

(4) Japanese Patent Kokai Publication No. 206330/1988 discloses a glass having a coefficient of thermal expansion of $85 \times 10^{-7}$ to $105 \times 10^{-7}/°C$. and a working temperature of from 500° to 550° C.

(5) One of commercially available glass, namely T 015 (manufactured by Iwaki Glass Co., Ltd.) has a coefficient of thermal expansion of $112 \times 10^{-7}$ and a working temperature of 450° C., and another, namely T 176 (manufactured by Iwaki Glass Co., Ltd.) has a coefficient of thermal expansion of $120 \times 10^{-7}/°C$. and a working temperature of 430° C.

However, each of the above conventional glasses has its own defects.

For example, since the glass (1) contains 30 to 70% of $V_2O_5$, it is black. Therefore, this glass does not satisfy the above requirement (d).

Since the glass (2) contains a large amount of ZnO, a combination of $SiO_2 + SnO_2 + TiO_2 + ZrO_2$, and a combination of $WO_3 + MoO_3$ which crystallize the glass easily, raw materials are not vitrified during melting, or the formed glass is easily devitrified during processing. Then, this glass does not satisfy the requirement (d).

Since the glass (3) contains a large amount, for example, 5% or more of $Na_2O$, it has insufficient water resistance and does not satisfy the requirement (c).

Since the glass (4) contains a large amount of $SiO_2$ or $Al_2O_3$ which crystallizes the glass easily, it is easily devitrified during processing and does not satisfy the requirement (c).

Since the commercially available glasses (5) both contain a large amount of PbO and $B_2O_3$ (80% or larger and 10% or larger, respectively), they have poor water resistance and do not satisfy the above requirement (c).

SUMMARY OF THE INVENTION

One object of the present invention is to provide a novel sealing glass which is suitable for sealing magnetic heads.

Another object of the present invention is to provide a magnetic head which is assembled using the novel sealing glass which has a comparatively lower working temperature, a coefficient of thermal expansion close to that of a magnetic material and good water resistance and which is not darkly colored or devitrified during processing.

According to the present invention, there is provided a magnetic head comprising magnetic core halves which are sealed with a sealing glass which consists essentially of:

1 to 75% by weight of $TeO_2$,
1 to 30% by weight of $B_2O_3$,
1 to 75% by weight of PbO,
1 to 25% by weight of CdO,
0 to 15% by weight of ZnO,
0 to 25% by weight of $Bi_2O_3$,
0 to 5% by weight of $A_2O$ wherein A is an alkali metal,
0 to 35% by weight of ARO wherein AR is an alkaline earth metal,
0 to 35% by weight of $La_2O_3$,
0 to 5% by weight of at least one oxide selected from the group consisting of $Al_2O_3$, $SiO_2$, $TiO_2$ and $ZrO_2$,
0 to 10% by weight of at least one oxide selected from the group consisting of $Ta_2O_5$, $Nb_2O_5$, $WO_3$ and $MoO_3$,
1 0 to 30% by weight of $PbF_2$, and
0 to 2% by weight of CoO, has a coefficient of thermal expansion of from $82 \times 10^{-7}/°C$. to $137 \times 10^{-7}/°C$. in a temperature range between 30° C. and 300° C., a working temperature of from 430° to 620° C. and water resistance of the first class, is not deeply colored and is not devitrified during the assembly of the magnetic head.

BRIEF DESCRIPTION OF THE DRAWINGS

FIGS. 4A to 4K illustrate the steps for producing the magnetic head.

FIGS. 5A to 5E are photographs showing conditions of an interface between superstructural nitride alloy and the glass of Sample No. 12 containing CoO.

DETAILED DESCRIPTION OF THE INVENTION

Figure 3:
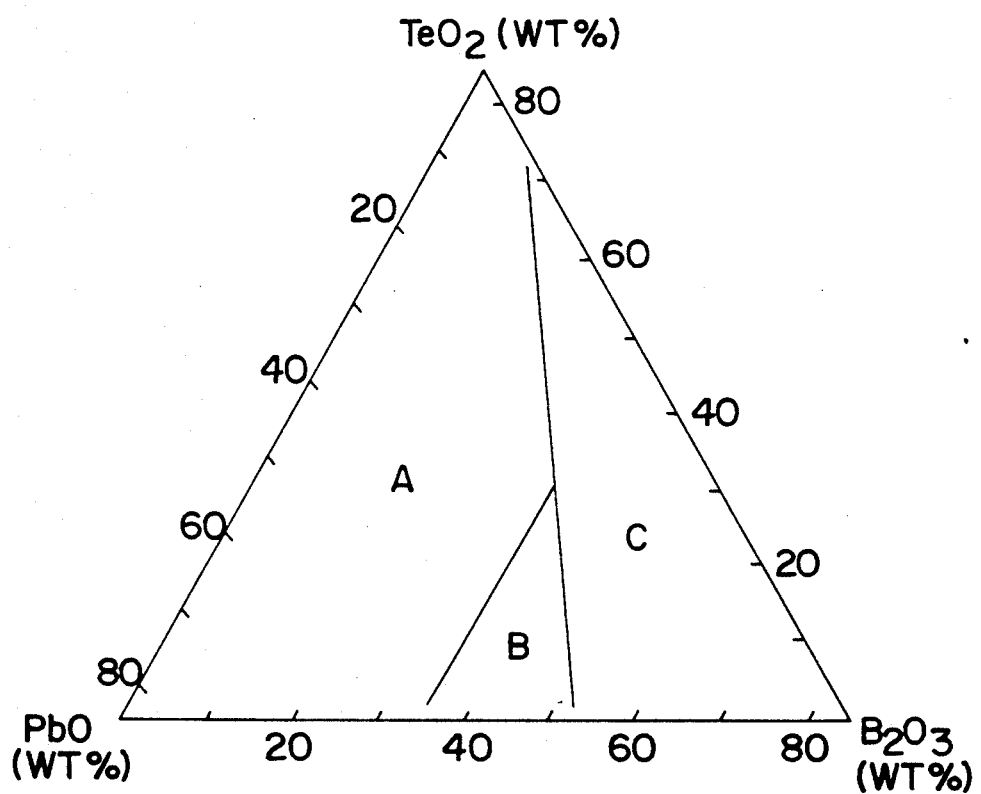
FIG. 3 is a ternary diagram of a sealing glass compositions comprising 10% by weight of CdO, 5% by weight of ZnO and varying amounts of $TeO_2$, $B_2O_3$ and PbO.
Figure 5D:
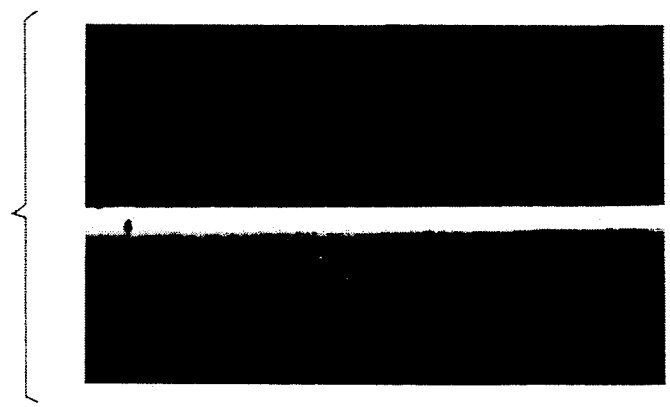
Figure 5E:

FIG. 3 is a ternary diagram of sealing glass compositions comprising 10% by weight of CdO, 5% by weight of ZnO and varying amounts of $TeO_2$, $B_2O_3$ and PbO which are major components. The sealing glass has a basic composition in the area A in FIG. 3 and optionally contains other components. The glass having a composition in the area B has a coefficient of thermal expansion of smaller than $80 \times 10^{-7}$ and does not satisfy the above requirement (b).

The water resistance of the sealing glass is measured and graded as follows:

Glass powder (particle size of 420 to 590 μm) of an amount corresponding to its specific gravity is charged in a platinum basket and immersed in 80 ml of a pure water having pH of 6.5 to 7.5 which is contained in a quartz made round flask. Then, the flask is heated on a boiling water bath for 60 minutes and a decreased weight percentage of the glass is measured and graded as follow:

| Class | Decreased weight (% by weight) |
| --- | --- |
| 1 | ≦0.04 |
| 2 | 0.05–0.09 |
| 3 | 0.10–0.24 |
| 4 | 0.25–0.59 |
| 5 | 0.60–1.09 |
| 6 | 1.10≦ |

This grading is determined by the Japan Optical glass Industries Association

The feature that "a glass is not deeply colored" intends to mean that the glass has no deep color by the inspection with naked eyes.

The material and structure of the magnetic head of the present invention may be the same as those of the conventional magnetic head except that the above novel sealing glass is used for assembling.

For example, the magnetic head core half is made of a ferrite or a magnetic material which is made of a magnetic alloy having a high magnetic permeability and saturation magnetic flux density and formed on a substrate.

FIGS. 4A to 4K illustrate a typical process for producing the magnetic head.

First, a piece of ferrite is cut out from an ingot of ferrite (FIG. 4A). The piece of ferrite is abrased to form a rod having a suitable shape and size (FIG. 4B). As shown in FIG. 4C, grooves are formed by track processing. Over the grooves, a glass is molded (FIG. 4D) and excessive glass is removed by abrasing. After forming a groove for coiling, a gap surface is abrased (FIG. 4E). Then, a gap glass is sputtered on a bonding surface and a pair of ferrite pieces are bonded to form a gap (FIG. 4F). The bonded pieces are cut to form a chip (FIG. 4G) and sides of the chip are abrased to a suitable thickness (FIG. 4H). The chip is then adhered to a base (FIG. 4I), and a tape flying face is abrased (FIG. 4J). Finally, a wire is wound to finish a magnetic head (FIG. 4K).

The sealing glass to be used for assembling the magnetic head of the present invention will be explained in connection with compositions shown in Tables 1 and 2.

Table 1 shows the compositions of the glass and also vitrification states, coefficients (α) of thermal expansion, yielding points, working temperatures, water resistance and total evaluation.

The vitrification states are evaluated according to the following criteria:

○: Vitrified during melting.

×: Vitrified during melting but devitrified during processing.

××: Not vitrified during melting.

The coefficient of thermal expansion is measured between 30° and 300° C. The yielding point is a temperature at which elongation stops in an alpha curve. The working temperature is a temperature at which the glass is fully expanded when the glass is drawn to a fiber having a diameter of 1 mm and a length of 25 mm and placed on a piece of ferrite having a width of 2.6 mm and a length of 25 mm. Water resistance is expressed in terms of "Class" determined by the Japan Optical Glass Industries Association.

TABLE 1

| Sample No. | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| Component (wt. %) | | | | | | | | | | | | | |
| $TeO_2$ | | 1 | 15 | 35 | 55 | 65 | 74 | 75 | 80 | 35 | 35 | 35 | 35 |
| $B_2O_3$ | 10 | 10 | 10 | 40 | 10 | 10 | 10 | 10 | 5 | | 15 | 30 | 35 |

TABLE 1-continued

| | | | | | | | | | | | | | |
|---|---|---|---|---|---|---|---|---|---|---|---|---|---|
| PbO | 75 | 74 | 60 | 10 | 20 | 10 | 1 | | | 50 | 35 | 20 | 15 |
| ZnO | 5 | 5 | 5 | 5 | 5 | 5 | 5 | 5 | 5 | 5 | 5 | 5 | 5 |
| CdO | 10 | 10 | 10 | 10 | 10 | 10 | 10 | 10 | 10 | 10 | 10 | 10 | 10 |
| $Bi_2O_3$ | | | | | | | | | | | | | |
| $Tl_2O$ | | | | | | | | | | | | | |
| $Li_2O$ | | | | | | | | | | | | | |
| BaO | | | | | | | | | | | | | |
| $Al_2O_3$ | | | | | | | | | | | | | |
| $La_2O_3$ | | | | | | | | | | | | | |
| Vitrification | X | ο | ο | ο | ο | ο | ο | X | XX | XX | ο | ο | XX |
| Coefficient of thermal expansion $(\times 10^{-7}/°C.)$ | | 121 | 124 | 129 | 135 | 136 | 137 | | | | 116 | 92 | |
| Yielding point (°C.) | | 325 | 353 | 378 | 391 | 391 | 392 | | | | 413 | 469 | |
| Working temp. (°C.) | | 430 | 460 | 490 | 510 | 510 | 510 | | | | 530 | 590 | |
| Water resistance (Class) | | 1 | 1 | 1 | 1 | 1 | 1 | | | | 1 | 1 | |
| Total evaluation | XX | ο | ο | ο | ο | ο | ο | XX | XX | XX | ο | ο | XX |

| Sample No. | 14 | 15 | 16 | 17 | 18 | 19 | 20 | 21 | 22 | 23 | 24 | 25 | 26 |
|---|---|---|---|---|---|---|---|---|---|---|---|---|---|
| Component (wt. %) | | | | | | | | | | | | | |
| $TeO_2$ | 35 | 35 | 35 | 35 | 35 | 35 | 35 | 35 | 35 | 35 | 35 | 35 | 35 |
| $B_2O_3$ | 10 | 10 | 10 | 10 | 10 | 10 | 10 | 10 | 10 | 10 | 10 | 10 | 10 |
| PbO | 45 | 35 | 30 | 25 | 10 | 49 | 30 | 25 | 20 | 35 | 35 | 30 | 20 |
| ZnO | | 10 | 15 | 20 | 5 | 5 | 5 | 5 | 5 | 5 | 5 | 5 | 5 |
| CdO | 10 | 10 | 10 | 10 | | 1 | 20 | 25 | 30 | 10 | 10 | 10 | 10 |
| $Bi_2O_3$ | | | | | | | | | | 5 | | | |
| $Li_2O$ | | | | | | | | | | | 5 | | |
| BaO | | | | | | | | | | | | 10 | 20 |
| $Al_2O_3$ | | | | | | | | | | | | | |
| $La_2O_3$ | | | | | | | | | | | | | |
| Vitrification | ο | ο | ο | XX | ο | ο | ο | ο | XX | ο | ο | ο | ο |
| Coefficient of thermal expansion $(\times 10^{-7}/°C.)$ | 137 | 124 | 118 | | 131 | 130 | 117 | 110 | | 125 | 135 | 133 | 136 |
| Yielding point (°C.) | 374 | 399 | 415 | | 377 | 378 | 422 | 450 | | 384 | 361 | 397 | 416 |
| Working temp. (°C.) | 490 | 520 | 530 | | 490 | 490 | 540 | 570 | | 490 | 470 | 520 | 540 |
| Water resistance (Class) | 1 | 1 | 1 | | 2 | 1 | 1 | 1 | | 2 | 1 | 1 | 1 |
| Total evaluation | ο | ο | ο | XX | X | ο | ο | ο | XX | X | ο | ο | ο |

| Sample No. | 27 | 28 | 29 | 30 | 31 | 32 | 33 | 34 |
|---|---|---|---|---|---|---|---|---|
| Component (wt. %) | | | | | | | | |
| $TeO_2$ | 35 | 35 | 35 | 35 | 35 | 35 | 35 | 35 |
| $B_2O_3$ | 10 | 10 | 10 | 10 | 10 | 10 | 10 | 10 |
| PbO | 10 | | 35 | 35 | 30 | 20 | 10 | |
| ZnO | 5 | 5 | 5 | 5 | 5 | 5 | 5 | 5 |
| CdO | 10 | 10 | 10 | 10 | 10 | 10 | 10 | 10 |
| $Bi_2O_3$ | | | | | | | | |
| $Li_2O$ | | | | | | | | |
| BaO | 30 | 40 | | | | | | |
| $Al_2O_3$ | | | | 5 | | | | |
| $La_2O_3$ | | | 5 | | 10 | 20 | 30 | 40 |
| Vitrification | ο | XX | ο | ο | ο | ο | ο | XX |
| Coefficient of thermal expansion $(\times 10^{-7}/°C.)$ | 136 | | 121 | 124 | 118 | 110 | 97 | |
| Yielding point (°C.) | 441 | | 415 | 410 | 419 | 421 | 460 | |
| Working temp. (°C.) | 560 | | 540 | 530 | 540 | 540 | 580 | |
| Water resistance (Class) | 1 | | 1 | 1 | 1 | 1 | 1 | |
| Total evaluation | ο | XX | ο | ο | ο | ο | XX | XX |

| Sample No. | 35 | 36 | 37 | 38 | 39 | 40 | 41 | 42 | 43 | 44 | 45 | 46 | 47 |
|---|---|---|---|---|---|---|---|---|---|---|---|---|---|
| Component (wt. %) | | | | | | | | | | | | | |
| $TeO_2$ | 35 | 35 | 35 | 35 | 35 | 35 | 35 | 35 | 35 | 35 | 35 | 18 | 25 |
| $B_2O_3$ | 10 | 10 | 10 | 40 | 10 | 10 | 10 | 10 | 10 | 10 | 10 | 14 | 30 |
| PbO | 35 | 35 | 35 | 35 | 30 | 35 | 30 | 35 | 30 | 35 | 30 | 45 | 30 |
| ZnO | 5 | 5 | 5 | 5 | 5 | 5 | 5 | 5 | 5 | 5 | 5 | 13 | 5 |
| CdO | 10 | 10 | 10 | 10 | 10 | 10 | 10 | 10 | 10 | 10 | 10 | 10 | 10 |
| $SiO_2$ | 5 | | | | | | | | | | | | |
| $TiO_2$ | | 5 | | | | | | | | | | | |
| $Zr_2O$ | | | 5 | | | | | | | | | | |
| $Nb_2O_5$ | | | | 5 | 10 | | | | | | | | |
| $Ta_2O_5$ | | | | | | 5 | 10 | | | | | | |
| $WO_3$ | | | | | | | | 5 | 10 | | | | |
| $MoO_3$ | | | | | | | | | | 5 | 10 | | |
| Vitrification | ο | ο | ο | ο | ο | ο | ο | ο | ο | ο | ο | ο | ο |
| Coefficient of | 114 | 115 | 113 | 121 | 109 | 125 | 105 | 128 | 122 | 130 | 124 | 102 | 86 |

TABLE 1-continued

| | | | | | | | | | | | | | |
|---|---|---|---|---|---|---|---|---|---|---|---|---|---|
| thermal expansion ($\times 10^{-7}$/°C.) | | | | | | | | | | | | | |
| Yielding point (°C.) | 425 | 422 | 426 | 412 | 439 | 409 | 448 | 402 | 418 | 391 | 409 | 408 | 482 |
| Working temp. (°C.) | 550 | 540 | 550 | 530 | 560 | 530 | 570 | 510 | 540 | 510 | 530 | 530 | 600 |
| Water resistance (Class) | 1 | 1 | 1 | 1 | 1 | 1 | 1 | 1 | 1 | 1 | 1 | 1 | 1 |
| Total evaluation | ○ | ○ | ○ | ○ | ○ | ○ | ○ | ○ | ○ | ○ | ○ | ○ | |

| Sample No. | 48 | 49 | 50 | 51 |
|---|---|---|---|---|
| Component (wt. %) | | | | |
| $TeO_2$ | 15 | 7.5 | 22.5 | 65 |
| $B_2O_3$ | 30 | 9.2 | 9.2 | 10 |
| PbO | 40 | 66.6 | 56.6 | 10 |
| ZnO | 5 | 3.8 | 3.8 | 5 |
| CdO | 10 | 9.4 | 4.4 | 10 |
| $SiO_2$ | | 2.7 | 2.7 | |
| $Al_2O_3$ | | 1 | 1 | |
| $Zr_2O$ | | | | |
| $Nb_2O_5$ | | | | |
| $Ta_2O_5$ | | | | |
| $WO_3$ | | | | |
| $MoO_3$ | | | | |
| Vitrification | ○ | ○ | ○ | ○ |
| Coefficient of thermal expansion ($\times 10^{-7}$/°C.) | 82 | 113 | 118 | 136 |
| Yielding point (°C.) | 500 | 363 | 378 | 391 |
| Working temp. (°C.) | 620 | 470 | 490 | 510 |
| Water resistance (Class) | 1 | 1 | 1 | 1 |
| Total evaluation | ○ | ○ | ○ | ○ |

Note:
*) $Bi_2O_3$.

TABLE 2

| Sample No. | 1 | 2 | 3 | 4 | 5 | 6 |
|---|---|---|---|---|---|---|
| Component (wt. %) | | | | | | |
| $TeO_2$ | 18 | 18 | 18 | 18 | 18 | 18 |
| $B_2O_3$ | 14 | 14 | 14 | 14 | 14 | 14 |
| PbO | 45 | 40 | 35 | 25 | 10 | |
| ZnO | 13 | 13 | 13 | 13 | 13 | 13 |
| CdO | 10 | 10 | 10 | 10 | 10 | 10 |
| $PbF_2$ | | 5 | 10 | 20 | 35 | 45 |
| Vitrification | ○ | ○ | ○ | ○ | X | X |
| Coefficient of thermal expansion ($\times 10^{-7}$/°C.) | 102 | 103 | 105 | 108 | 114 | 118 |
| Yielding point (°C.) | 408 | 401 | 388 | 381 | 357 | 353 |
| Working temp. (°C.) | 530 | 520 | 510 | 500 | 470 | 460 |
| Water resistance (Class) | 1 | 1 | 1 | 1 | 1 | 1 |
| Total evaluation | ○ | ○ | ○ | ○ | XX | XX |

In the Sample Nos. 1 to 9, contents of $TeO_2$ and PbO were changed. When the content of $TeO_2$ is zero or exceeded 75% by weight, it was difficult to vitrify the material. This means that the content of pbO is restricted to a range between 1 and 75% by weight.

In the Sample Nos. 10 to 13, a content of $B_2O_3$ was changed. When it was zero or exceeded 30% by weight, it was difficult to vitrify the material.

In the Sample Nos. 14 to 17, a content of ZnO was changed. ZnO can decrease the coefficient of thermal expansion while it does not change the working temperature of the glass materially. When the content of ZnO exceeds 15% by weight, vitrification becomes difficult.

In the Sample Nos. 18 to 22, a content of CdO, which is one of the essential components, was changed. CdO improves the water resistance of the glass. When no CdO is present, the water resistance is deteriorated, while when the content of CdO exceeds 25% by weight, vitrification becomes difficult.

In the Sample No. 23, $Bi_2O_3$ was added to the glass composition. They can decrease the coefficient of thermal expansion while it does not change the working temperature of the glass materially. They may be contained in an amount of up to 25% by weight. When their content exceeds 25% by weight, the water resistance may tend to decrease.

In the Sample No. 24, $Li_2O$ which a typical example of the alkali metal oxide ($A_2O$) was added to the glass composition. The alkali metal oxide increases the coefficient of thermal expansion. When the content of the alkali metal oxide exceeds 5% by weight, the vitrification becomes difficult.

In the Sample Nos. 25 to 28, BaO which is a typical example of the alkaline earth metal oxide (ARO) was added to the glass composition. BaO can increase the coefficient of thermal expansion, while it does not change the water resistance substantially. When the content of BaO exceeds 35% by weight, the vitrification becomes difficult.

In the Sample No. 29, $Al_2O_3$ was added to the glass composition. $Al_2O_3$ decreases the coefficient of thermal expansion. When its content exceeds 5% by weight, the vitrification becomes difficult.

In the Sample Nos. 30 to 34, $La_2O_3$ was added to the glass composition. $La_2O_3$ increases the water resistance. When its content exceeds 35% by weight, the vitrification becomes difficult.

In the Sample Nos. 35 to 37, $SiO_2$, $TiO_2$ or $ZrO_2$ was added to the glass composition. They decrease the coefficient of thermal expansion. When their content exceeds 5% by weight, the vitrification becomes difficult.

In the Sample Nos. 38 to 45, $Nb_2O_5$, $Ta_2O_5$, $WO_3$ or $MoO_3$ was added to the glass composition. They decrease the coefficient of thermal expansion. When its content exceeds 10% by weight, the vitrification becomes difficult.

The Sample Nos. 46 to 51 were other various examples of the glass compositions.

All the glasses were not devitrified and had the thermal coefficient of from $82 \times 10^{-7}$ to 137 to $10^{-7}/°C.$, the working temperature of from 430° to 620° C. and water resistance of "First" or "Second" Class. Therefore, they satisfy the requirements for the sealing glass for the magnetic head.

Table 2 shows the change of the properties when PbO in the glass composition of the Sample No. 46 was replaced with $PbF_2$. When the content of $PbF_2$ exceeded 35% by weight, the glass devitrified during processing. Therefore, the content of $PbF_2$ should be limited in the range between 0 and 30% by weight.

FIGS. 5A to 5E show conditions of an interface between superstructural nitride alloy and the glass of Sample No. 12 to which CoO was added in varying amounts.

FIGS. 5A to 5E correspond to the glass of the Sample No. 12 to which 0, 0.2, 0.5, 1.0 and 2.0% by weight of CoO was added, respectively.

As understood from FIGS. 5A to 5E, the addition of CoO suppressed the interaction at the interface between the superstructural nitride and the glass. However, when 2.0% by weight of CoO was added, the glass was partly cracked. Then, the content of CoO should not exceed 2.0% by weight.

COMPARATIVE EXAMPLE

Table 3 shows the properties of the conventional glass (2) (Sample Nos. C1 and C2), the conventional glass (3) (Sample Nos. C3 and C4) and the conventional glass (4) (Sample No. C5 and C6).

Each of them was difficult to vitrify, had poor water resistance or was devitrified during processing. Therefore, they are not practically usable. Since the conventional glasses (1) and (5) have the drawbacks as discussed in the above, they are not tested here.

TABLE 3

| Sample No. | C1 | C2 | C3 | C4 | C5 | C6 |
|---|---|---|---|---|---|---|
| Component (wt. %) | | | | | | |
| $TeO_2$ | 21.1 | 31.2 | | | 19 | 15 |
| $B_2O_3$ | 9.2 | 11.1 | 16 | 14 | 19 | 15 |
| PbO | 36.9 | 40.4 | 48 | 50 | 53 | 60 |
| ZnO | 8.1 | 10.6 | 9 | 7 | | |
| $SiO_2$ | | | 12 | 15 | 5 | 2 |
| $TiO_2$ | | 2.3 | | | | |
| $Al_2O_3$ | | | 3 | 4 | 1.5 | 6 |
| WO | 15.3 | | | | *)1 | *)2 |
| $MoO_3$ | 9.5 | | | | | |
| $SnO_2$ | | 4.4 | | | | |
| $Na_2O$ | | | 12 | 10 | | |
| MgO | | | | | 1.5 | |
| Vitrification | XX | XX | ○ | ○ | X | X |
| Coefficient of thermal expansion | | | 119 | 121 | 96 | 102 |

TABLE 3-continued

| Sample No. | C1 | C2 | C3 | C4 | C5 | C6 |
|---|---|---|---|---|---|---|
| Component (wt. %) | | | | | | |
| ($\times 10^{-7}/°C.$) | | | | | | |
| Yielding point (°C.) | | | 385 | 390 | 380 | 360 |
| Working temp. (°C.) | | | 550 | 550 | 540 | 510 |
| Water resistance (Class) | | | 3 | 3 | 1 | 1 |
| Total evaluation | XX | XX | XX | XX | XX | XX |

Note:
*) CuO.

EXAMPLES

Figure 1:
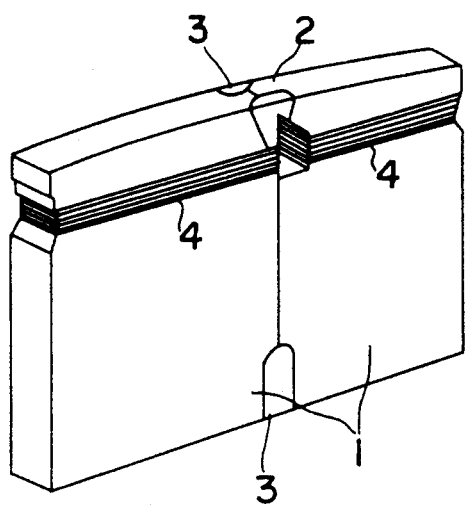
FIG. 1 is a perspective view of a magnetic head.
Figure 2:
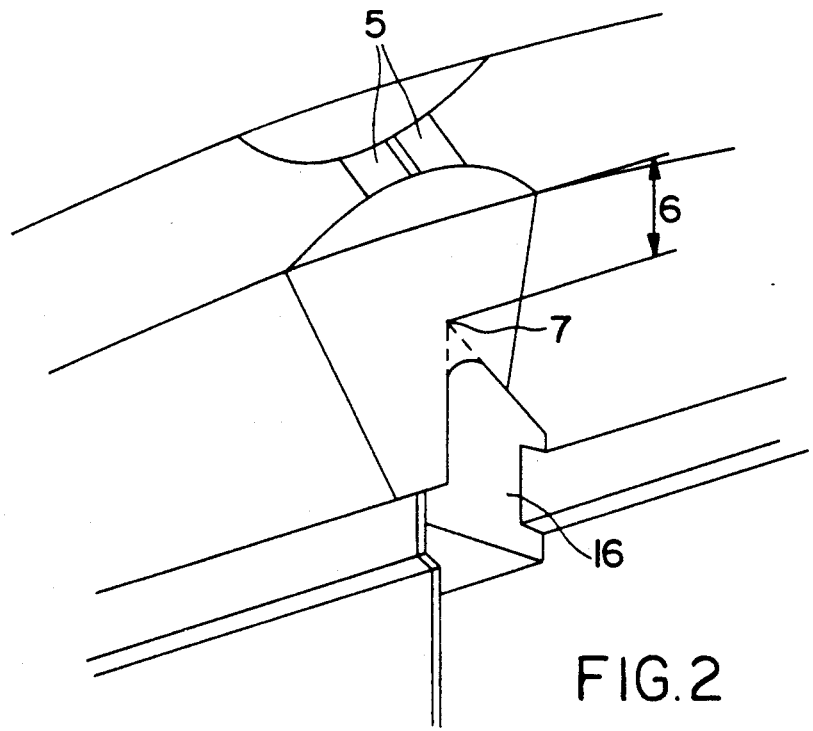
FIG. 2 is an enlarged partial view of a magnetic head.

Using the glass of the Sample No. 48 shown in Table 1, a magnetic head of FIG. 2 was assembled. As the ferrite, a Mn—Zn ferrite having a coefficient of thermal expansion of $115 \times 10^{-7}$ was used.

The glass was not deteriorated by water and had good transparency so that an apex was clearly observed.

Using the glass of the Sample No. 1 shown in Table 1, a magnetic head of FIG. 2 was assembled. As an amorphous alloy, a Co-Nb-Zr-N film which is disclosed in National Technical Report, 37 (1991) 498, the disclosure of which is hereby incorporated by reference, was used, and as the ferrite, a Mn—Zn ferrite having a coefficient of thermal expansion of $124 \times 10^{-7}$ was used.

The glass was not deteriorated by water and had good transparency so that an apex was clearly observed.

What is claimed is:

1. A magnetic head comprising magnetic core halves which are sealed with a sealing glass which consists essentially of:

1 to 75% by weight of $TeO_2$,
  1 to 30% by weight of $B_2O_3$,
  1 to 75% by weight of PbO,
  1 to 25% by weight of CdO,
  0 to 15% by weight of ZnO,
  0 to 25% by weight of $Bi_2O_3$,
  0 to 5% by weight of $A_2O$ wherein A is an alkali metal,
  0 to 35% by weight of ARO wherein AR is an alkaline earth metal,
  0 to 35% by weight of $La_2O_3$,
  0 to 5% by weight of at least one oxide selected from the group consisting of $Al_2O_3$, $SiO_2$, $TiO_2$ and $ZrO_2$,
  0 to 10% by weight of at least one oxide selected from the group consisting of $Ta_2O_5$, $Nb_2O_5$, $WO_3$ and $MoO_3$,
  0 to 30% by weight of $PbF_2$, and
  0 to 2% by weight of CoO, has a coefficient of thermal expansion of from $82 \times 10^{-7}/°C.$ to $137 \times 10^{-7}/°C.$ in a temperature range between 30° C. and 300° C., a working temperature of from 430° to 620° C. and water resistance of the first class, is not deeply colored and is not devitrified during the assembly of the magnetic head.

* * * * *